United States Patent [19]

Tsuji

[11] Patent Number: 4,868,646
[45] Date of Patent: Sep. 19, 1989

[54] IMAGE PICKUP APPARATUS FOR AN ELECTRONIC ENDOSCOPE

[75] Inventor: Kiyoshi Tsuji, Tanashi, Japan
[73] Assignee: Olympus Optical Co., Ltd., Japan
[21] Appl. No.: 170,549
[22] Filed: Mar. 21, 1988

[30] Foreign Application Priority Data

Apr. 3, 1987 [JP] Japan .................................. 62-82447
Aug. 24, 1987 [JP] Japan ................................ 62-209836
Jan. 8, 1988 [JP] Japan ..................................... 63-2241

[51] Int. Cl.$^4$ ............................................. H04N 3/14
[52] U.S. Cl. ...................................... 358/98; 358/229; 358/213.19
[58] Field of Search .............. 358/228, 213.31, 213.14, 358/213.12, 315, 209

[56] References Cited

U.S. PATENT DOCUMENTS

| | | | |
|---|---|---|---|
| 4,539,586 | 9/1985 | Danna et al. ........................... | 358/98 |
| 4,608,506 | 8/1986 | Tanuma ................................... | 358/315 |
| 4,634,884 | 1/1987 | Hayashimoto et al. ......... | 358/213.14 |
| 4,663,669 | 6/1987 | Kinoshita et al. ............... | 358/213.19 |
| 4,667,230 | 6/1987 | Arakawa et al. ....................... | 358/98 |
| 4,678,938 | 7/1987 | Nakamura ....................... | 358/213.12 |
| 4,692,798 | 9/1987 | Seko et al. ........................... | 358/228 |
| 4,712,138 | 12/1987 | Kyuma et al. .................. | 358/213.31 |
| 4,746,984 | 4/1988 | Matsumoto et al. ........... | 358/213.12 |

FOREIGN PATENT DOCUMENTS 60-244161 5/1984 Japan .

*Primary Examiner*—Jin F. Ng
*Assistant Examiner*—Mehdi Haghani
*Attorney, Agent, or Firm*—Ostrolenk, Faber, Gerb & Soffen

[57] ABSTRACT

An image pickup apparatus comprises an image pickup unit including a solid-state image sensor and a drive voltage generator circuit disposed adjacent to the image sensor and having a drive voltage adjusting device for adjusting a drive voltage required to properly drive the image sensor, a signal processor unit for applying various voltages and signals to the image pickup unit and a signal cable system connecting the image pickup unit to the signal processor unit, whereby proper voltages can be applied to the image sensor with a reduced number of signal cables and a reduced size of the apparatus.

12 Claims, 5 Drawing Sheets

IMAGE PICKUP APPARATUS FOR AN ELECTRONIC ENDOSCOPE

BACKGROUND OF THE INVENTION

The present invention relates to an image pickup apparatus for an electronic endoscope, and more particularly, to an image pickup apparatus which has a solid-state image sensor and is capable of properly adjusting a drive voltage for driving the solid-state image sensor.

In general, a television camera and a video camera utilize an image pickup apparatus having a solid-state image sensor such as a CCD (charge coupled device). In addition, it is well known that an electronic endoscope (which is also called an electronic scope) utilizes an image pickup apparatus having a solid-state image sensor for observation and photographing operations which is disposed at the distal end thereof. Further, there is known an image pickup apparatus in which an image pickup unit having a solid-state image sensor and a signal processor are separately provided and electrically connected by means of signal cables therebetween in order to reduce the size of the camera head. More particularly, electronic endoscopes of this type include a solid-state image sensor disposed at the distal end of the insertable portion of the endoscope and a control unit for the image sensor (separately provided from the image sensor which is detachably connected to the endoscope by means of a connector.

However, some of the drive signal voltages used to drive the solid-state image sensor need to be adjusted to match the particular image sensor used and thereby ensure that proper image signals will be obtained. Accordingly, the control unit must be adjusted to meet the requirements of signal voltages for the particular solid-state image sensor being used. The adjustment must be made whenever the endoscope is interchanged (i.e., whenever the control unit is connected to a different image sensor) To solve this problem, a prior art image pickup apparatus utilizes an adjusting resistor disposed in a connector or an operating portion of the endoscope which resistor has been previously adjusted, as disclosed in, for example, USP 4,539,586 and Japanese Laid-Open Patent Application Sho 60-244,161.

However, many different drive signals are required for a solid-state image sensor with the result that a number of the endoscope signal cables extend from the operating portion to the distal end thereof. This is disadvantageous because it is necessary to make the diameter of the endoscope as small as possible. To overcome this problem, it is possible to dispose a generator circuit for a drive signal voltage adjacent to a solid-state image sensor so as to generate a required signal at the distal end of the endoscope so that the number of signal cables from the control unit to the distal end can be reduced. Even in this case, however, it is necessary to adjust the drive voltage because the requirements of each solid-state image sensor varies. When an adjusting resistor is arranged adjacent to the distal end as in the prior art, it disadvantageously increases the distal end in size.

SUMMARY OF THE INVENTION

It is an object of the present invention to provide an image pickup apparatus which reduces both the number of signal cables required and the size of the adjusting portion for each solid-state image sensor and is capable of obtaining a proper image picture.

According to the present invention, an image pickup apparatus comprises an image pickup unit including a solid-state image sensor and a generator circuit for generating drive voltages having a device for adjusting an amplitude of a drive voltage required to properly drive the solid-state image sensor. The image pickup unit is connected to a signal processor unit by signal cables so as to be supplied with a variety of voltage signals from the signal processor unit. The voltage signals are converted to those required for the image sensor in the drive voltage generator circuit to drive the solid-state image sensor. At this time, the voltage signals are adjusted so as to meet voltage requirements proper for individual solid-state image sensor by the adjusting device.

In the present invention, the drive voltage generator circuit having the adjusting device is disposed adjacent to the solid-state image sensor, so that it is possible to supply proper drive voltages to the solid-state image sensor with the reduced number of signal cables and without increasing the same size of the insertable portion of an endoscope.

DETAILED DESCRIPTION OF PREFERRED EMBODIMENTS

Figure 1:
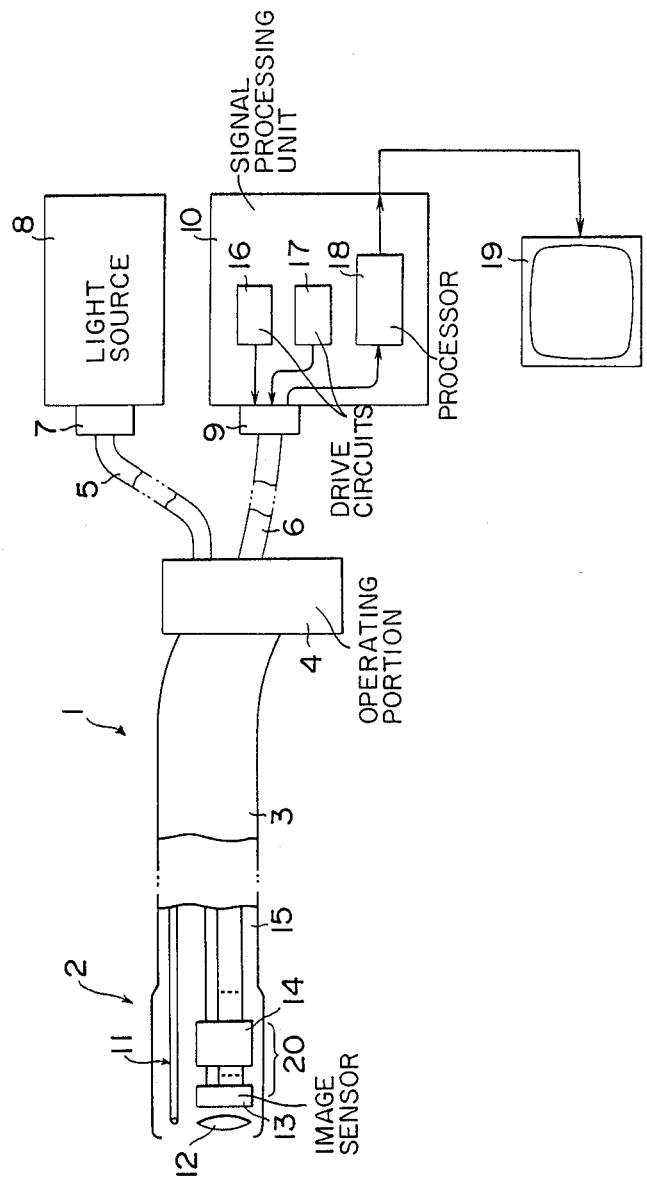
FIG. 1 is a schematic diagram showing an electronic endoscope system including an image pickup apparatus according to an embodiment of the present invention.
Figure 2:
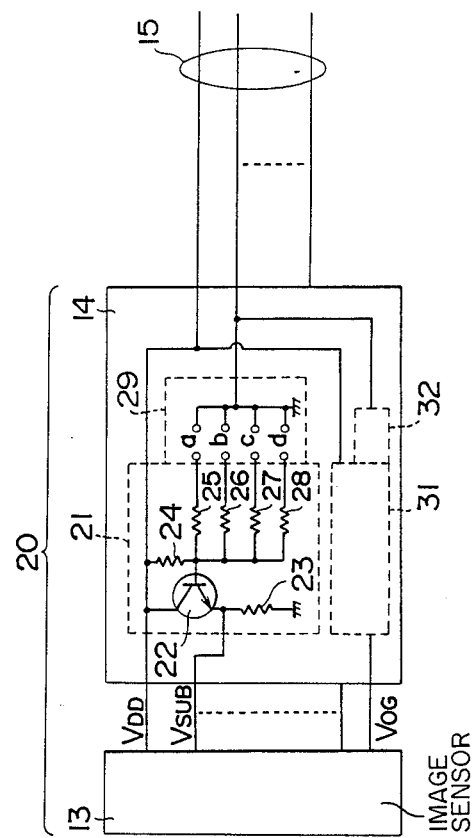
FIG. 2 is an electric circuit diagram showing an example of a solid-state image sensor and a generator circuit for generating drive voltages which constitute the image pickup unit shown in FIG. 1.

In FIGS. 1 and 2, an electronic endosope 1 includes an image pickup unit 20 disposed within the distal end 2 of a flexible insertable portion 3 thereof.

The proximal end of the insertable portion 3 is connected to an operating portion 4 of the endoscope 1. A light guide cord 5 extending from the operating portion 4 is connected to a light source 8. A signal cord 6 extending from the operating portion 4 is connected to a signal processor unit 10 by means of a connector 9. The front end of an optical fiber bundle 11 used for illumination is disposed at the distal end 2. The optical fiber bundle 11 is inserted within the insertable portion 3 and the light guide cord 5 and connected to the light source 8 by means of a connector 7 so as to introduce light rays from the light source 8. An objective 12 is disposed at the distal end 2. A solid-state image sensor 13 is disposed on an image forming place of the objective 12. A circuit substrate 14 (provided with a drive voltage generator circuit) is disposed adjacent to the solid-state image sensor 13. The substrate 14 and the connector 9 are connected to each other by means of a pluralilty of signal lines 15 which extend through the insertable portion 3, operating portion 4 and signal cord 6. The signal lines 15 are supplied with a variety of voltages and signals from drive circuits 16, 17 within the signal processor unit 10. An output signal from the image sensor 13 is supplied to a process circuit 18 within the signal processor unit 10. The process circuit 18 converts an output signal from the image sensor 13 to an image video signal which is applied to a display unit 19 connected to the signal processor unit 10.

Figure 3:
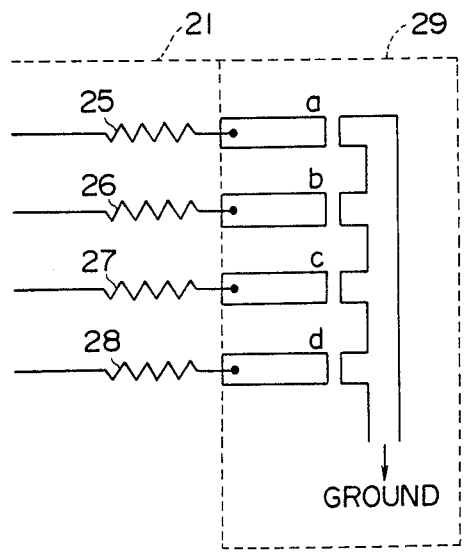
FIG. 3 is a partial circuit diagram showing an example of a drive voltage adjusting device of the drive voltage generator circuit shown in FIG. 2.

FIG. 2 shows the image pickup unit 20 comprising the solid-state image sensor 13 and the drive voltage generator circuit substrate 14. As shown in FIG. 2, while the solid-state image sensor 13 is provided with terminals for inputting and outputting various voltages and signals, a substrate voltage, for example, is one of the drive voltages to be adjusted. The substrate voltage applied to the terminal $V_{SUB}$ of the solid-state image sensor 13 must be adjusted to a level between 4 and 14 V because of particular image sensor being used. As a practical matter, it is sufficient to adjust the substrate voltages in steps of about 0.5 V. In this embodiment, a substrate voltage generator 21 is provided on the drive voltage generator circuit substrate 14 together with an adjusting device therefore. In the substrate voltage generator 21 (which is constituted by an integrated circuit), an emitter follower circuit is formed by a transistor 22 and an emitter resistor 23. A base voltage for the transistor 22 is converted into a low impedance as an emitter output to be delivered as the substrate voltage. The base voltage of the transistor 22 is pulled up by a resistor 24 to a positive voltage $V_{DD}$ and connected to a plurality of resistors 25, 26, 27 and 28 on the ground potential side thereof. Terminals of the resistors 25 to 28 on their IC sides are connected to pattern electrode 29 on the substrate 14. An example of the pattern electrode 29 is shown in FIG. 3, in which the pattern endoscope 29 is partly separated to form an endoscope on the resistor side and a ground electrode.

The substrate voltage is adjusted by connecting selected resistors 25 to 28 to ground with the others being disconnected (non-conductive condition) or pulled up. In the pattern endoscope 29 shown in FIG. 3, all contacts a to d are open initially and only contacts to be selected are made conductive by soldering or applying a conductive material across the electrode gap. In this embodiment, since four resistors are combined, sixteen levels of voltages can be obtained. To increase the number of steps of adjusted voltage available, the number of resistors is increased. When the number of resistors is n, $2^n$ levels of voltages can be obtained.

Figure 4:
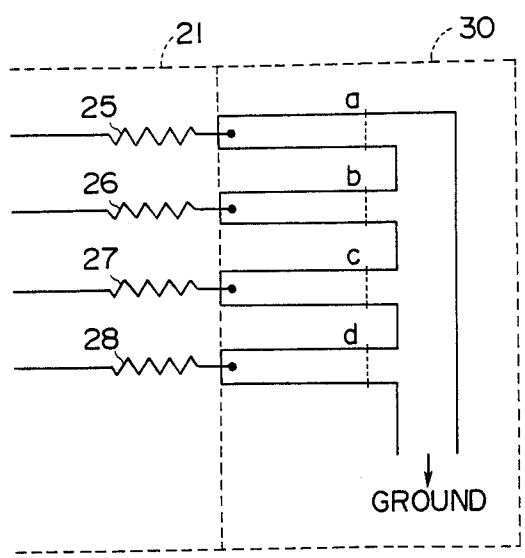
FIG. 4 is a partial circuit diagram showing another example of a drive voltage adjusting device of the drive voltage generator circuit shown in FIG. 2.

FIG. 4 shows another example of a pattern endoscope. All contacts a to d of a pattern endoscope 30 are initially made in a conductive condition and grounded. The voltages are adjusted by disconnecting contacts other than those of resistors to be selected in an open condition.

Figure 5:
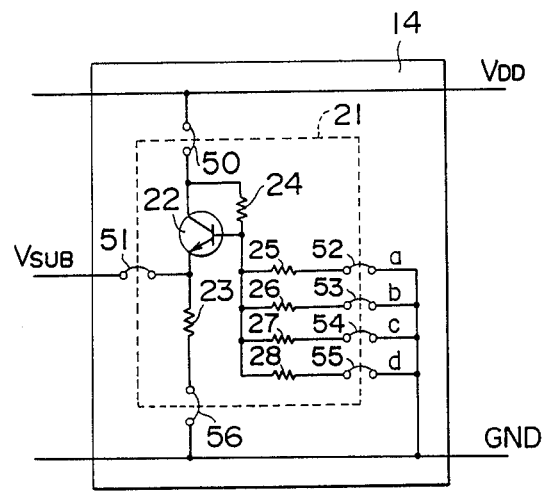
FIG. 5 is an electrical circuit diagram showing a still another example of a drive voltage adjusting device of the drive voltage generator circuit.

FIG. 5 shows still another example of a voltage adjusting device of a substrate voltage generator circuit 21 provided on the drive voltage generator substrate 14. The voltage adjusting device adjusts the voltage using bonding wires. Since the substrate voltage generator circuit 21 of this example is constructed in a manner similar to that shown in FIG. 2, like elements are given like reference characters and their description will be omitted.

The fixation of the substrate voltage generator circuit 21 composed of IC chips on the substrate 14 and the connection of a power supply and signal lines to the generator circuit 21 are performed by a bonding process. Namely, the supply line of a power source voltage $V_{DD}$ and the collector of a transistor 22 are connected by a bonding wire 50 to apply the voltage $V_{DD}$, a $V_{SUB}$ terminal of applying the substrate voltage and the emitter of the transistor 22 are connected by a bonding wire 51 and a resistor 23 and the ground line are connected by a bonding wire 56.

A power supply line and signal lines are generally connected to a circuit composed of IC chips by means of bonding wires. This method is utilized in this example. Specifically, one end of the plurality of resistors 25 to 28 are connected to respective selected contacts a to d by means of bonding wires 52 to 55. With such structure, the selected contacts a to d are opened or closed by properly rendering the bonding wires 52 to 55 conductive or non-conductive and thus the substrate voltage can be adjusted. With this example, it is possible to reduce the size of the substrate.

Further, there are methods of connecting IC chips such as a flip-chip method in addition to a bonding method, which are, of course, equally practicable to form selected contacts with junctions between an IC chip and a substrate.

The foregoing description relates to the substrate voltage $V_{SUB}$ of the adjusting voltage generator circuit on the substrate 14. An output gate voltage $V_{OG}$ is another drive voltage which may be adjusted. The output gate voltage can be adjusted by an output gate voltage generator circuit 31 and a pattern 32 for selecting resistors in a manner similar to the substrate voltage. Necessary adjustments of other drive voltages can be performed in a similar manner.

Further, the substrate 14 has a bias generating function for generating other drive voltages required for the solid-state image sensor 13, a dividing function of a single drive voltage into a plurality of drive signals and a buffer function to an output signal, which are not shown in FIG. 5. All these functions are performed with IC structures and there is little problem in space for arranging the IC structures on the substrate 14. In addition, it is possible to realize them using discrete parts, chip parts, printed parts and the like, because of little problem in space.

According to the embodiment described above, it is possible to reduce the number of signal lines and the size of an image pickup unit and to drive a solid-state image sensor with proper drive voltages.

Figure 6:
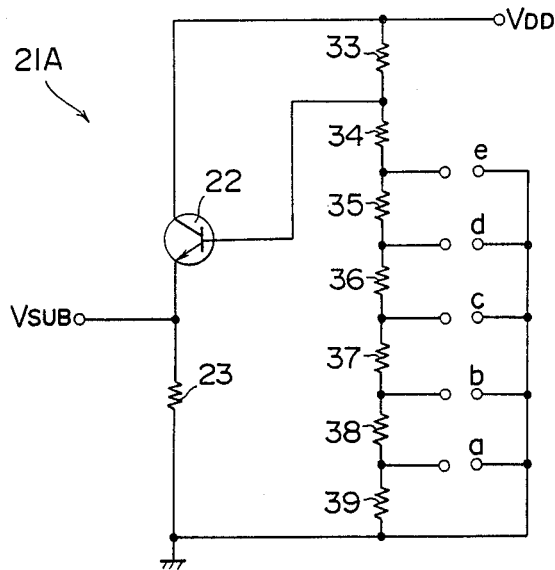
FIG. 6 is an electrical circuit diagram showing a further example of a generator circuit for generating drive voltages and FIG. 7 is an electrical circuit showing a still further example of a generator circuit for generating drive voltages.

FIG. 6 shows a further example of a generator circuit for generating the substrate voltage. In a generator circuit 21A, an emitter follower circuit comprising a transistor 22 and an emitter resistor 23 is similar to the embodiment shown in FIGS. 2 and 5. The base of the transistor 22 is pulled up to a positive voltage $V_{DD}$ of a power supply by a resistor 33. A plurality of resistors 34 to 39 are connected in series on the ground potential sides to be grounded through the resistor 39. Each junction point between resistors 34 to 39 is connected to a respective electrode of selected contacts a to e and one of the contacts a to e is selectively grounded in order to obtain a desired substrate voltage. In the generator circuit 21A shown in Fig. 6, it is necessary to provide the same number of selected resistors as that of required voltages. However, only one resistor need be grounded and there is regularity in that substrate voltages to be generated fall as the contacts a to e are selected in the order thereof. Accordingly, this structure is effective when a generating voltage is changed by using a mechanism of moving a position of a contact member such as a slide switch.

Figure 7:
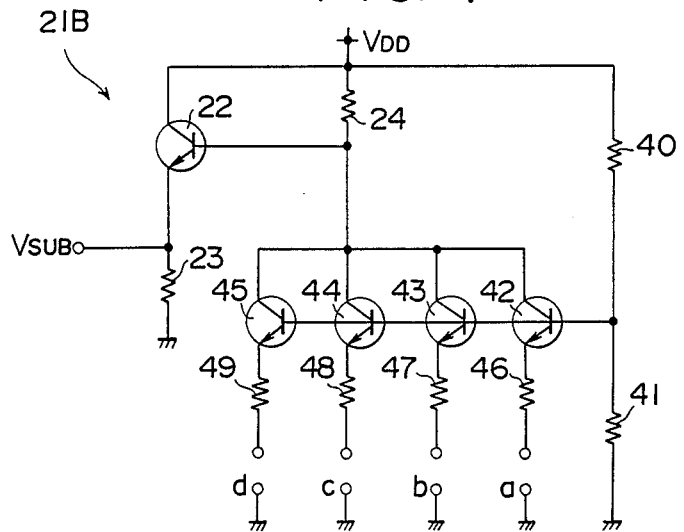

FIG. 7 shows a still further example of a substrate voltage generator circuit. A generator circuit 21B shown in FIG. 7 produces a step voltages to be applied to the base of an emitter follower circuit comprising a transistor 22 and an emitter resistor 23 by addition of currents.

Since base potentials of transistors 42 to 45 are given by a divided voltage ratio between resistors 40, 41 all of emitter potentials of the transistors 42 to 45 are equal. When any contacts a to d is selected, a current which is inverse in proportion to a value of resistor 45 to 49 corresponding to the selected contact a to d flows between collector and emitter of the corresponding transistor 42 to 45. Accordingly, the total sum of the currents flows through a resistor 24. Thus, it is possible to vary a base voltage of the transistor 22 in steps. If values of the resistors 46 to 49 are taken in multiple proportion such as R, 2R, 4R and 8R, 24 levels of output voltages of the emitter follower circuit are produced in equal parts to the number of four contacts.

While, in the examples of the drive voltage generator circuits described above, an npn type transistor is employed and the resistors are arranged on the ground side, it is possible to employ a pnp type transistor and to arrange the resistors on the pull-up side.

While the light source 8 and signal processor unit 10 shown in FIG. 1 are separately provided, it is possible to combine both into a unitary body and contain them in a single case. It will be understood that the present invention is applicable to a variety of other image pickup apparatus in addition an electronic endoscope.

What is claimed is:

1. An electronic endosope, comprising:
   (A) an operating portion, said operating portion having connections adapted to receive drive signals from an external drive circuit which can be removably coupled to said operating portion;
   (B) a flexible insertable portion having a proximal and a distal end, said proximal end being coupled to said operating portion; and
   (C) an image pickup unit located in said distal end of said flexible insertable portion, said image pickup unit including:
      (1) a solid-state image sensor; and
      (2) a drive voltage adjustment circuit located adjacent said solid-state sensor and electrically coupled to said operating portion, said drive voltage adjustment circuit receiving one or more drive signals applied to said operating portion, adjusting the level of one or more of said drive signals, and applying the so adjusted drive signals to said solid-state image sensor.

2. An electronic endoscope according to claim 1 in which said drive voltage adjustment circuit is able to adjust each of said one or more drive voltages in steps.

3. An electronic endoscope according to claim 1 in which one of said drive voltages is a substrate voltage required to drive said solid-state image sensor.

4. An electronic endoscope according to claim 1 in which one of said drive voltages is an output gate voltage required to drive said solid-state image sensor.

5. An electronic endoscope according to claim 1 in which said drive voltage adjustment circuit adjusts at least one of said drive signals by current amplification of a drive voltage divided by a plurality of resistors.

6. An electronic endoscope according to claim 1 in which said drive voltage adjusting circuit includes a plurality of resistors whose effective configuration can be changed by an individual adjusting said circuit.

7. An electronic endoscope according to claim 6, in which said drive voltage adjustment circuit comprises:
   a plurality of resistors connected in parallel with one another to form a voltage divider circuit and
   means for enabling an individual adjusting said apparatus to selectively connect and/or disconnect said resistors from said voltage divider circuit.

8. An electronic endoscope according to claim 6 in which said drive voltage adjusting circuit comprises:
   a voltage divider circuit including a plurality of series connected resistors; and
   means for enabling an individual adjusting said adjusting circuit to selectively remove one or more of said resistors from said voltage divider circuit.

9. An electronic endoscope according to any one of claims 7 or 8 in which said plurality of resistors each has an associated resistor electrode which opposes and is spaced from a ground electrode and wherein said drive voltage is adjusted by electrically connecting selected resistor electrode to said ground electrode.

10. An electronic endoscope according to any one of claims 7 or 8 in which said plurality of resistors each has an associated resistor electrode which is normally connected to a ground electrode and said operator may adjust said drive voltage by disconnecting selected said resistor electrode from said ground electrode.

11. An electronic endoscope according to claim 1, wherein said drive voltage adjustment circuit adjusts the level of said drive signals by a fixed respective amount.

12. An electronic endoscope according to claim 1 further including said external drive circuit and means for removably coupling said operation portion to said external drive circuit.

* * * * *